United States Patent
Petersson et al.

(10) Patent No.: US 9,401,735 B2
(45) Date of Patent: Jul. 26, 2016

(54) SOFT CHANGING OF MOBILE COMMUNICATION SYSTEM

(71) Applicant: Telefonaktiebolaget L M Ericsson (publ), Stockholm (SE)

(72) Inventors: Justus Petersson, Hasselby (SE); Qiang Li, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 14/006,478

(22) PCT Filed: Jun. 28, 2013

(86) PCT No.: PCT/SE2013/050819
§ 371 (c)(1),
(2) Date: Sep. 20, 2013

(87) PCT Pub. No.: WO2014/209188
PCT Pub. Date: Dec. 31, 2014

(65) Prior Publication Data
US 2015/0005033 A1     Jan. 1, 2015

(51) Int. Cl.
*H04B 1/38* (2015.01)
*H04B 1/3816* (2015.01)
*H04W 8/20* (2009.01)

(52) U.S. Cl.
CPC ............ *H04B 1/3816* (2013.01); *H04W 8/205* (2013.01)

(58) Field of Classification Search
CPC ............................ H04B 1/3816; H04W 12/06
USPC .................................. 455/411, 450, 556, 558
See application file for complete search history.

(56) References Cited

U.S. PATENT DOCUMENTS

2008/0109877 A1* 5/2008 Park .................. H04W 8/04 726/3
2010/0228404 A1* 9/2010 Link, II ............ G06F 9/44542 701/1

(Continued)

FOREIGN PATENT DOCUMENTS

EP     2466976 A1     6/2012

OTHER PUBLICATIONS

3GPP Draft; S1-12044 RESUM, 3rd Generation Partnership Project (3GPP), Mobile Competence Centre; 650, Route Des Lucioles; F-06921 Sophia-Antipolis Cedex, France, Feb. 2, 2012, 6 pages, XP050574660.

(Continued)

*Primary Examiner* — Md Talukder
(74) *Attorney, Agent, or Firm* — Rothwell, Figg, Ernst & Manbeck, P.C.

(57) ABSTRACT

A subscriber identity is changed for a mobile terminal (10) through the initiation of a sending of an instruction to the mobile terminal (10), via a first mobile communication system (18, 30) to which the mobile terminal is attached, to change subscriber identity from a first subscriber identity (IMSI1) used in the first mobile communication system to a second subscriber identity (IMSI2) for use in a second mobile communication system, and the initiation, after obtaining knowledge of the mobile terminal having attached to the second mobile communication system based on the second subscriber identity, a detachment procedure in the first mobile communication system in relation to the first subscriber identity. The mobile terminal (10) receives the instruction to change, attaches to the second mobile communication system based on the second subscriber identity and detach from the first mobile communication system after having attached to the second mobile communication system.

27 Claims, 4 Drawing Sheets

(56) References Cited

U.S. PATENT DOCUMENTS

| | | | |
|---|---|---|---|
| 2010/0273475 A1* | 10/2010 | Lee | H04L 47/10 455/426.1 |
| 2012/0309344 A1* | 12/2012 | Ferrazzini | H04M 1/72519 455/406 |
| 2013/0165073 A1* | 6/2013 | Madsen | H04W 12/06 455/411 |
| 2013/0165182 A1* | 6/2013 | Christensen | H04B 1/3816 455/558 |
| 2014/0329504 A1* | 11/2014 | Gupta | H04Q 3/0045 455/411 |
| 2015/0005033 A1* | 1/2015 | Petersson | H04W 8/205 455/558 |
| 2015/0156679 A1* | 6/2015 | Li | H04W 36/0022 370/331 |

OTHER PUBLICATIONS

CSMG, "Reprogrammable SIMs: Technology, Evolution and Implications", Internet Citation, Sep. 25, 2012, pp. 1-95, XP002716258.

* cited by examiner

SOFT CHANGING OF MOBILE COMMUNICATION SYSTEM

CROSS-REFERENCE TO RELATED APPLICATION

This application is a 35 U.S.C. §371 National Phase Entry Application from PCT/SE2013/050819, filed Jun. 28, 2013, and designating the United States.

TECHNICAL FIELD

The invention relates to mobile communication systems. More particularly, the invention relates to a subscriber identity changing arrangement for at least one mobile communication system and a method for changing mobile communication system, a mobile terminal for communication with at least one mobile communication system and a method of changing communication from a first mobile communication system to a second mobile communication system.

BACKGROUND

Mobile communication systems where mobile terminals, often termed user equipment, communicate wirelessly have become more and more popular.

Mobile communication systems, such as public land mobile systems are operated by Operators. There may in geographical areas, such as in a country, exist a number of different operators.

At the same time it is today not uncommon that mobile terminals are involved in data communication without user involvement, often referred to as machine-machine communication. A mobile terminal may thus be provided in a machine, such as a car and communicate with other machines via the mobile communication system.

The mobile terminal may in this cases also be owned by a company. Such a company may not want the mobile terminal to be too tightly linked to a specific operator, but may want to change operator or at least have the option of such a change of operator.

Various access rights for the mobile terminal to a mobile communication system is often related to a subscription and a subscriber identity, such as an International Mobile Subscriber Identity (IMSI). The handling of such a subscription on behalf of the mobile terminal is then often carried out with the use of a smart card such as a Subscriber Identity Module (SIM) a Universal Integrated Circuit Card (UICC) or an embedded UICC (eUICC).

In order to change from a first mobile communication system to a second mobile communication system the following steps may have to be performed:
1. The smart card downloads, using the radio circuit of the mobile terminal and the access network of the first mobile communication system, a new subscription remotely from a subscription manager
2. The subscription manager sends a mobile terminated SMS (SMS-MT) to the smart card to enable the new subscription
3. The smart card enables the new subscription, disables old subscription, and switches to the subscription
4. The smart card triggers the mobile terminal to reset
5. the mobile terminal resets and
6. the mobile terminal re-connects to the network with the new subscription using a new IMSI.

Steps 3-5 are often termed "Enabling Subscription Process". As can be seen the mobile terminal has to be reset in order to switch (attach) to the new system. The "Enabling Subscription Process" takes at least 30 seconds to complete with reset of the mobile terminal. Thereafter it takes several seconds to attach to the new mobile communication system with the new subscription. The delay is too long if there is real-time traffic going on with the mobile terminal or if the mobile terminal is not delay-tolerant, and the major reason for the delay is that the mobile terminal needs to reset to switch and attach to the new network.

The delay may for instance be problematic if the mobile terminal is involved in an activity that requires fast communication or if it needs to have the option to issue hazard warnings. Such a delay may thus be unacceptable.

There is therefore a need for an improvement when changing from one subscription to another. There is particularly a need for a change of subscription that is considerable faster than the one described above.

SUMMARY

One object of the invention is thus to provide an improvement in the change from a first mobile communication system to a second mobile communication system.

This object is according to a first aspect of the invention achieved by a subscriber identity changing arrangement for at least one mobile communication system. The arrangement comprises a processor and memory. The memory contains computer instructions executable by the processor through which computer instructions the subscriber identity changing arrangement is operative to:
initiate the sending of an instruction to a mobile terminal to change subscriber identity from a first subscriber identity used in a first mobile communication system to a second subscriber identity for use in a second mobile communication system, and
initiate a detachment procedure in the first mobile communication system in relation to the first subscriber identity.

The instruction is sent via a first mobile communication system to which the mobile terminal is attached and the detachment procedure is initiated after knowledge of the mobile terminal having attached to the second mobile communication system based on the second subscriber identity has been obtained.

This object is according to a second aspect also achieved by a method for changing mobile communication system a mobile terminal is to communicate with. The method is performed in a subscriber identity changing arrangement and comprises:
initiating the sending of an instruction to the mobile terminal to change subscriber identity from a first subscriber identity used in a first mobile communication system to a second subscriber identity for use in a second mobile communication system, and
initiate a detachment procedure in the first mobile communication system in relation to the first subscriber identity.

The instruction is sent via a first mobile communication system to which the mobile terminal is attached and the detachment procedure is initiated after knowledge of the mobile terminal having attached to the second mobile communication system based on the second subscriber identity has been obtained The object is according to a third aspect also achieved through a mobile terminal for communication with at least one mobile communication system. The mobile terminal comprises a radio circuit for communicating with a first and a second mobile communication system. The mobile terminal is also configured to:

receive via a first mobile communication system to which the mobile terminal is attached, an instruction from a subscriber identity changing arrangement to change subscriber identity from a first subscriber identity used in the first mobile communication system to a second subscriber identity for use in the second mobile communication system, attach to the second mobile communication system based on the second subscriber identity, and detach from the first mobile communication system after having attached to the second mobile communication system.

The object is according to a fourth aspect furthermore achieved by a method of changing communication from a first mobile communication system to a second mobile communication system. The method is performed in a mobile terminal and comprises receiving, via the first mobile communication system to which the mobile terminal is attached, an instruction from a subscriber identity changing arrangement to change subscriber identity from a first subscriber identity used in the first mobile communication system to a second subscriber identity for use in the second mobile communication system, attaching to the second mobile communication system based on the second subscriber identity, and detaching from the first mobile communication system after having attached to the second mobile communication system.

The invention according to the above-mentioned aspects has a number of advantages. The detachment from the first mobile communication system and the attachment to the second mobile communication system is all handled through the use of these mobile communication systems. The mobile terminal may thereby always be on and do not need to be reset. This allows a swift change, without unnecessary loss of data. The change over is also simple in that no manual operation of the mobile terminal is required. Furthermore, since the detachment from the first mobile communication system is not made until after the attachment to the second mobile communication system, it is possible to take measures that avoid the loss of data in case there is an on-going data transmission during the time of transfer.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
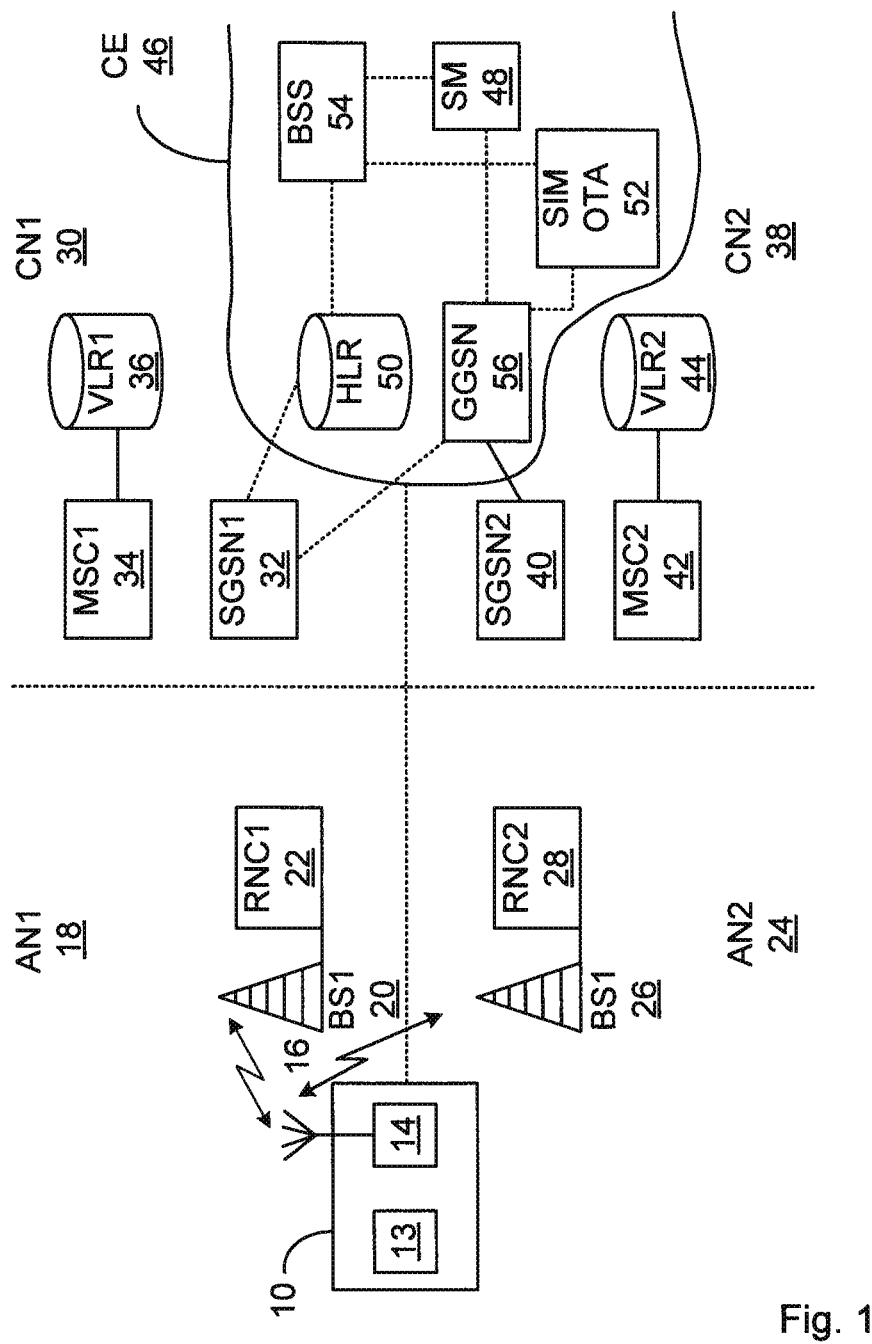
FIG. 1 schematically shows a mobile terminal in contact with two mobile communication systems, where each mobile communication system is divided into an access network and a core network.

In FIG. 1 there is shown a mobile terminal 10 communicating with a first and a second mobile communication system, where each mobile communication system comprises an access network AN1 18 and AN2 20 and a core network CN1 30 and CN2 38.

The mobile terminal comprises a memory module 12 and a radio circuit 14 connected to an antenna 16 in order to communicate with a first base station BS1 20 as well as with a second base station BS2 26. The first base station BS1 20 is a part of the first access network 18 that in turn is associated with a first operator, while the second base station BS2 26 is a part of the second access network AN2 24 that in turn is associated with a second operator.

The first base station 20 is connected to a first radio network controller RNC1 22, while the second base station 26 is connected to a second radio network controller RNC2 28. The first base station 20 and first radio network controller 22 are thus provided in the first access network 18 of the first mobile communication system, while the second base station 26 and second radio network controller 28 are provided in the second access network 24 of the second mobile communication system. In order to simplify the description given of aspects of the invention, these are the only elements of the two access networks being disclosed and described here. It should however be realized that each access network may comprise several more base stations and several more radio network controllers. It should also be realize that in some mobile communication systems there may be no radio network controllers. In this case the access networks may only comprise base stations. Base stations may also be referred to as nodeBs or evolved nodeBs (eNodeB). An access network may also be provided without radio network controller. It may thus solely consist of base stations.

The radio network controller 22 of the first access network 18 communicates with a first core network CN1 30. In this first core network 30 there is a first serving GPRS support node SGSN1 32, where GPRS is an acronym for General Packet Radio Service. There is also a first mobile switching centre MSC1 34 connected to a first visitor location register VLR1 36.

In a similar manner the radio network controller 28 of the second access network 24 communicates with a second core network CN2 38. In this second core network there is a second serving GPRS support node SGSN2 40. There is also a second mobile switching centre MSC2 42 connected to a second visitor location register VLR2 44.

In the core networks there are also a number of further entities. In aspects of the invention these are shared by both the core networks. In both the core networks there is thus a common Home Location Register HLR 50, a common Gateway GPRS Support Node GGSN 56, which are communicating with a business support system BSS 54, a subscription manager SM 48 and a SIM OTA 52. SIM is an acronym of Subscriber Identity Module, which is a type of memory module used in many mobile communication applications. OTA is an acronym of over-the-air. SIM OTA 52 is a unit for remotely programming removable memory modules of mobile terminals over the air. These units are often provided in each core network, but are in some embodiments of the invention provided as a group of common entities 46. They are thus shared by both core networks. This could for instance be the case if the core network functionality of both operators are provided by the same service provider, a core network service provider.

Figure 2:
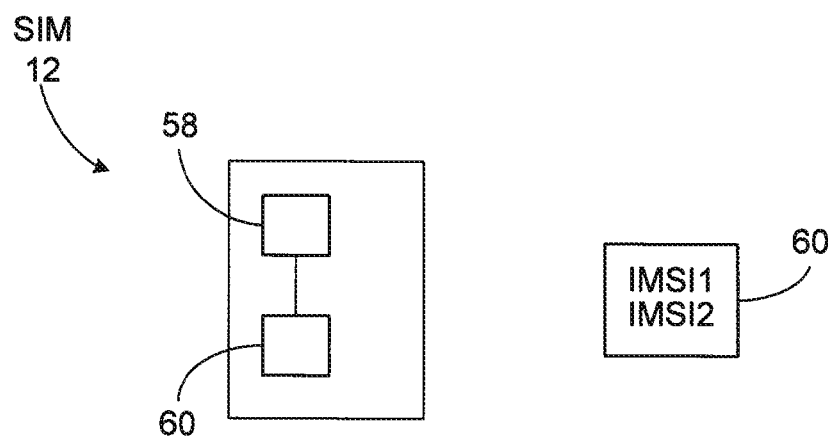
FIG. 2 shows a block schematic of a smart card in the mobile terminal and shows two subscriber identities on a memory of the smart card.

FIG. 2 schematically shows the memory module 12 of the mobile terminal, which may be a removable memory module. The memory module of the mobile terminal may be a SIM card. In embodiments of the invention a so-called smart card and therefore comprises a processor 58 with connected program memory 60. The smart card may for instance be a Universal Integrated Cirucit Card (UICC) or an embedded Universal Integrated Circuit card (eUICC). In the memory module 60 there are stored two different subscriber identities, each in the form of an international subscriber identity (IMSI). There is a first subscriber identity IMSI1 and a second subscriber identity IMSI2. The first subscriber identity IMSI1 is associated with the first mobile communication system, while the second subscriber identity IMSI2 is associated with the second mobile communication system. In some embodiments the memory module 60 also comprises computer program code for performing some of the functions of the mobile terminal for changing between the two mobile communication systems. In other embodiments the radio circuit comprises such computer program code. In yet other embodiments both the smart card 12 and the radio circuit 14 comprises such functions.

Figure 3:
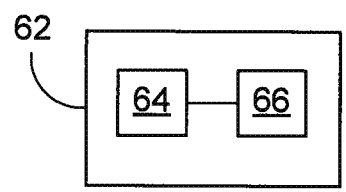
FIG. 3 shows a block schematic of an exemplifying subscription identity changing arrangement comprising a processor and a memory.

FIG. 3 shows a block schematic of one variation of the subscriber identity changing arrangement provided for the two core networks. The arrangement 62 is provided in the form of a server or computer and likewise comprises a processor 64 with associated program memory 66.

Figure 4:
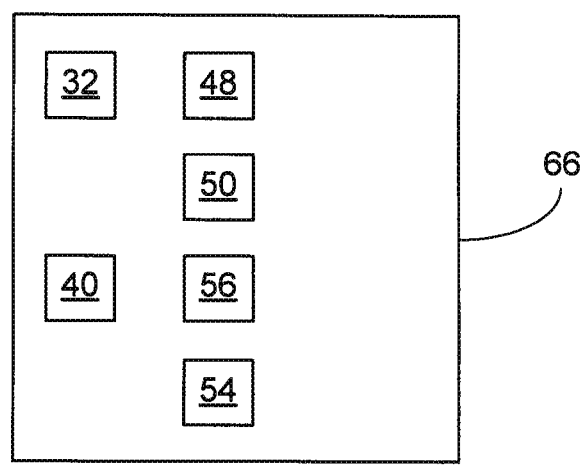
FIG. 4 shows a block schematic of the content of the memory of the arrangement of FIG. 3 with a number of functional blocks.

FIG. 4 shows a block schematic of the memory comprising a number of program modules. In the memory there is a first SGSN module 32, SGSN1, and a second SGSN2 module 40, SGSN2. There is further an SM module 48, an HLR module 50, a SIM OTA module 48, a BSS module 54 and a GGSN module 56. It can thus he seen that the memory comprises modules for forming the functions of both core networks and particularly for forming common entities. It should here be realized that in some embodiments the memory only comprises a HLR module. In other variations it only comprises an HLR module and the SM module. In yet other variations it only comprises an HLR module and the SIM OTA module. It is in all of these variations possible that also the GGSN module is included and/or that the BSS module is included and/or that the SGSN modules are included. It is furthermore possible that also SGSN1 is included.

The MSCs are typically provided as separate entities that are not part of the arrangement. However, they may in some embodiments also be included in the arrangement.

It should here be realized that the modules may be provided in several different computers communicating with each other. It is also possible that one or more of such computers comprises more than one module.

Figure 5:
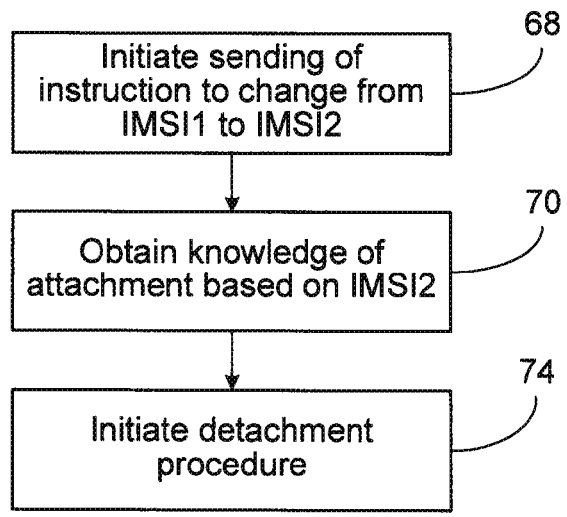
FIG. 5 shows a flow chart of a number of method steps being performed in the subscription identity changing arrangement according to a first embodiment.
Figure 6:
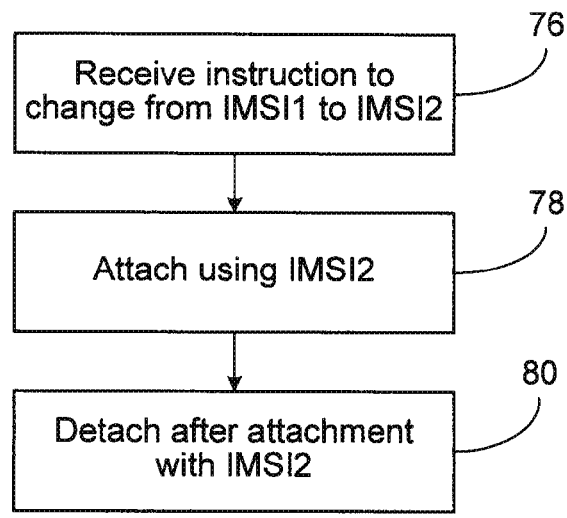
FIG. 6 shows a flow chart of number of corresponding method steps of the first embodiment being performed in the mobile terminal.

Now a first embodiment will be descried with reference being made to the previously mentioned FIG. 1-4 as well as to FIG. 5, which shows a flow chart of a number of method steps being performed in the arrangement, and to FIG. 6, which shows a flow chart of number of corresponding method steps being performed in the mobile terminal.

In the following the mobile terminal 10 will be described as communicating with the core networks. In all these cases the communication will be performed using the corresponding access networks. However, this will in the following be omitted in order to provide a clearer description of the various embodiments.

As is known in the art a mobile terminal needs to have a subscription or at least a subscriber identity in order to be allowed communication in a mobile communication system. The subscriber identity may for instance be used in identifying various access rights provided for the user in the mobile communication system.

The mobile terminal has received both the subscriber identities IMSI1 and IMSI2 before the method steps being described in the steps below are being carried out. Both subscriber identities are thus already provided locally in the mobile terminal, for instance being stored in the memory 60 of the smart card 12. One of the IMSIs, and in this example IMSI1 is furthermore active and being used by the mobile terminal for communicating with the corresponding mobile communication system. The other is passive and not yet in use.

It is now assumed that the user, which in this case may be a company having a number of mobile terminals in various applications, selects that a change is to be made from the first mobile communication system to the second mobile communication system. The user may for instance provide instructions to the BSS 54 about a change from the first mobile communication system to the second mobile communication system. This change will then involve a switch from using the first subscriber identity IMSI1 to using the second subscriber identity IMSI2. Therefore the BSS 54 informs a suitable module of the arrangement involved in handling the changeover. This module is typically one of the common entities. The module of the arrangement that is involved in the informing of the changeover may be the HLR 50. In another variation it may be the SM 48. In yet another variation it may be the SIM OTA 52. The informing may also be triggered by the BSS 54. The initiating of the sending of a instruction to change from IMSI1 to IMSI2 , step 68, may thus be initiated or triggered by the BSS 55, the HLR 50 or SM 48. A module, which may be SM 48, SIM OTA 52 HLR 50 or SGSN1 32 will then ensure that the mobile terminal 10 is provided with instructions to change from IMSI1 to IMSI2 , step 68. This may be done through the informing module contacting, either directly or indirectly via a SGSN, the access network, such as the RNC 22 of the first access network 18. The instructing may involve telling the first SGSN1 32 to send an instruction or request to attach to the second mobile communication system using IMSI2. The instruction may thus comprise a request, to the mobile terminal to attach to the second mobile communication system while it is attached to the first mobile communication system. The information may be conveyed via a special paging message sent via the first access network triggered by SGSN1. It may also be sent as an enabling signal intended for the smart card 12 and provided by the SM 48. The change thus involves the mobile terminal detaching from the first mobile communication system and attaching to the second mobile communication system. The detaching and attaching may be made under the supervision of an attaching control module, which may be the HLR 50. It may also be the BSS 54. The attaching control module obtains knowledge of the mobile terminal to attaching to the second mobile communication system based on IMSI2, step 70, for instance through the mobile station wanting to attach to SGSN2. This may be obtained through receiving a message either directly or via for instance the associated SGSN of the fact. Thereafter the attaching control module initiates a detachment procedure, step 74, i.e. a procedure for detaching the mobile terminal 10 from the first mobile communication system. It thus ensures that the detachment is made after the attachment to the second mobile communication system. In case the attachment control module is the HLR, then knowledge of the attachment may be known at the completion of the attachment procedure. If the attachment control module is the BSS 54, then completion may be notified by an HLR.

The mobile terminal thus receives the instructions to change from IMSI1 to IMS2, step 76, which may be received by the subscription changing functionality on the smart card 12 for instance in the form of a message concerning the enabling of a new subscription received from the SM 48. As an alternative a page with attachment data concerning an attachment to the second mobile communication system may be received and handled by the radio circuit 14. After receiving the above mentioned information, the radio circuit 14 attaches to the second communication network using IMSI2, step 78. The attaching is here performed before a detaching is made. The attaching may also be performed based on the radio circuit requesting to be attached to the second mobile communication system. The attaching may be caused by activities of the smart card. The smart card may for instance instruct the radio circuit to send a request to attach to the second mobile communication system. In other instances the radio circuit may use attachment data obtained in a page for requesting to attach to the second mobile communication system. After an attachment has taken place, which may be known through the radio circuit receiving an attach accept message, the mobile terminal detaches from the first mobile communication system, step 80. Detachment is thus made after the attachment has been made.

As can be seen from what has been described above the detachment from the first mobile communication system and the attachment to the second mobile communication system is all handled through the use of the core networks. The mobile terminal may thereby always be on and do not need to be reset. This allows a swift change, without unnecessary loss of data. If for instance important messages are to be conveyed to the mobile terminal, it my be able to be aware of these in a completely different way than if having to be turned off or reset. The change over is also simple in that no manual operation of the mobile terminal is required. Furthermore, since the detachment from the first mobile communication system is not made until after the attachment to the second mobile communication system, it is possible to take measures that avoid the loss of data in case there is an on-going data transmission during the time of transfer. This also allows an operator change to be made for interrupt-sensitive services, e.g. hazard warning for automotive applications.

Figure 7:
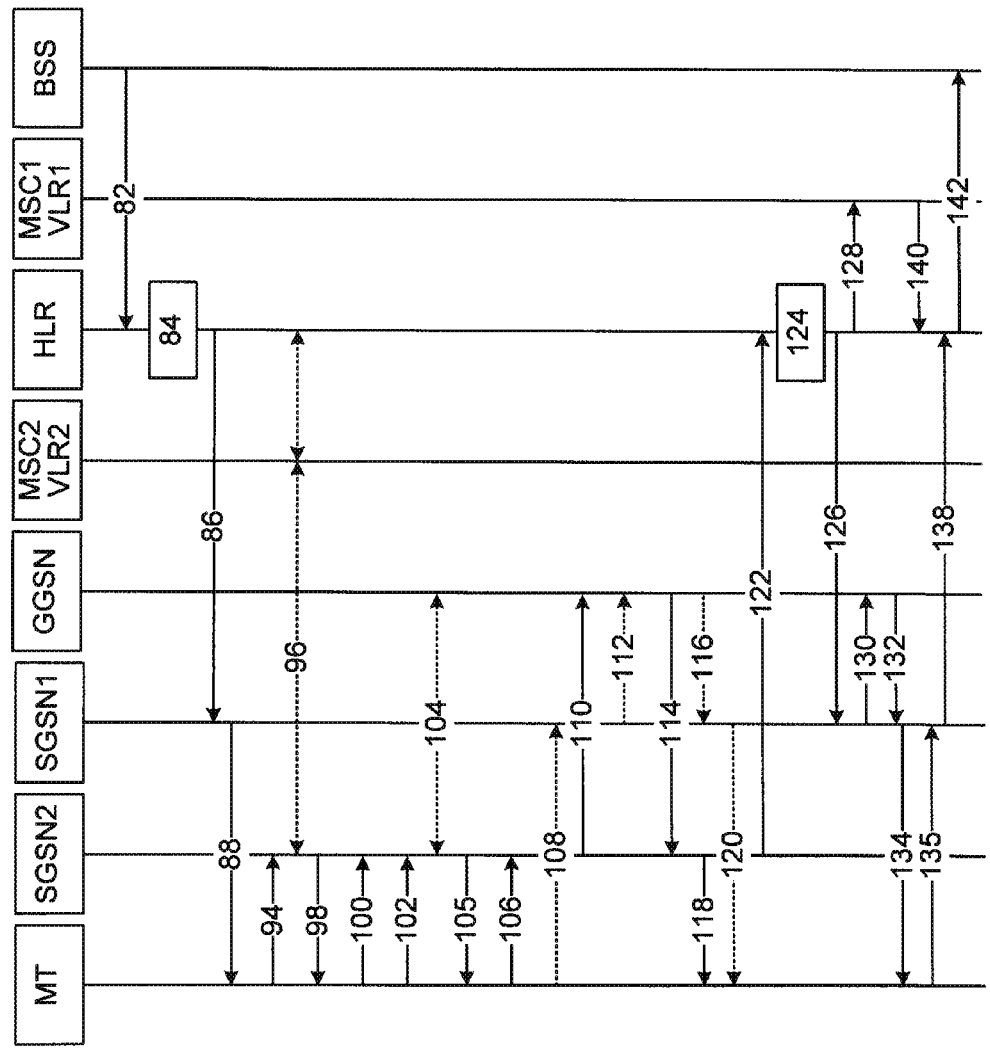
FIG. 7 shows a number of signals being exchanged between the mobile terminal and the two core networks according to a second embodiment.

Now a second embodiment will be described with reference being made to FIG. 1-4, as well as to FIG. 7, which shows a number of signals exchanged between the mobile terminal and the two core networks.

In this embodiment a soft handover from the first mobile communication system to the second mobile communication system is performed when subscriber identity is changed. This is essentially done through the subscriber identity changing arrangement triggering to switch to the second mobile communication system with the new subscription by:
1. enabling the mobile terminal new network connectivity with the new subscription
2. establishing the new network connectivity
3. smoothly moving real time traffic from the first mobile communication system to the second mobile communication system without losing traffic, and
4. thereafter detaching and deactivating the mobile terminal from the first mobile communication system.

In order to allow this to be performed, subscription handling functionality of the smart card may need to allow dual enabled subscriptions. The subscription handling functionality thus allows two IMSIs of two different mobile communication systems to be used simultaneously. Here exemplified by IMSI1 and IMSI2. There may also exist a special requirement of the radio circuit 14 of the mobile terminal 10. It may need to support a dual-attach mode and be able to attach to the second mobile communication system before being detached from the first mobile communication system and be able to perform this attachment when the new subscription has been enabled. The radio circuit of the mobile terminal 10 may also need to support initiation of a packet data protocol (PDP) context activation request to the second core network after the new subscription has been enabled and after the mobile station has been attached to the second core network. The radio circuit may also need to support simultaneous sending of data in uplink traffic on two simultaneously existing PDP contexts in two different core networks. In this embodiment the GGSN 56 may also need to support sending of downlink traffic on two simultaneously existing PDP contexts.

The second embodiment may in more detail be carried out in the following way:

After having received a user selection of a change of a mobile communication system, the BSS 54 initiates a subscription change operation and notifies 82 the HLR 50 to trigger a subscription change from a subscription associated with the first subscriber identity IMSI1 to a subscription associated with the second subscriber identity IMSI2. It thus sends a request to the HLR to change subscription from the subscription of IMSI1 to a subscription for IMSI2

HLR 50, which may implement the attachment control module, then activates 84 the new subscription. This may be done through associating a number of access rights to IMSI2 in the second mobile communication system as well as associating a mobile terminal identity and phone number of the mobile terminal 10 to IMSI2. This grants the mobile terminal the use of various bearer services in the second mobile communication system such as Short Message Service (SMS), data and voice and allows the mobile terminal to participate in various signaling procedures.

The HLR then sends 86 an instruction to SGSN1 32 to page the mobile terminal 10 with data, which data would include IMSI2 and other possible attachment data, such as phone number and bearer services, etc. SGSN1 then pages 88 the mobile terminal 10 via the first access network 18, where the attachment data is included in the page. Thereafter the radio circuit of the mobile terminal uses the data of the page in a request to attach to the second mobile communication system.

The radio communication circuit 14 of the mobile terminal 10 therefore sends an "attach request" 94 to the second core network 24 and here to SGSN2 40, i.e. the mobile terminal 10 attempts to attach with SGSN2 40 and/or MSC2/VLR2 42/44 using IMSI2 after the page has been received. When the request 94 is received by SGSN2 40, it gets involved in an attachment procedure 96 involving SGSN2, MSC2/VLR2 and HLR 50. The attachment may involve SGSN2 sending an update location request to the HLR 50, which responds with an update location acknowledgement. In this attachment procedure the HLR may also insert subscriber data in SGSN2 as well as in MSC2/VLR2. The data inserted may comprise IMSI2 and other possible attachment data, such as phone number and bearer services, etc. After a successful attachment, SGSN2 40 sends an attach accept 98, to which the radio circuit 14 of the mobile terminal response with an Attach complete message 100.

As this attachment is taking place, the mobile terminal 10 is still attached with the first core network 30, and here with SGSN 32 and MSC1 34/VLR1 36. There is thus a dual attachment in place.

As the mobile terminal 10 is connected to the first mobile communication system, there exists a PDP context for the mobile terminal in the first core network 30. This involves a GPRS Tunnelling protocol (GTP) tunnel between SGSN1 32 and GGSN 56. The PDP context may comprise an IP address assigned to the mobile terminal in the first mobile communication system, IMSI1 , as well as Tunnel Endpoint identities for GGSN and SGSN1.

When the attachment to the second mobile communication system has been performed, the mobile terminal 10, and here the radio circuit 14 of the mobile terminal 10 may request 102 activation of a PDP context to SGSN2 40. This thus takes place at the same time as there is an existing PDP context with SGSN1 32 for the mobile terminal 10. Based on the request for activation of as PDP context, SGSN2 40 and GGSN 56 are then involved in a PDP context activation procedure 104. This may involve assigning an IP address to the mobile terminal as well as the setting up of a GTP tunnel between SGSN2 40 and GGSN 56. When the PDP context has been established, SGSN2 40 responds to the radio circuit 14 of the mobile terminal 10 with a PDP context activation Accept 105.

The mobile terminal 10 was sending possible uplink traffic towards SGSN1 32 before the new PDP context was activated, and shall send any uplink traffic 106 towards SGSN2 40 after the new PDP context is activated 106. It may during a handover phase here also send traffic 108 to SGSN1 even after the new context has been activated. If traffic is sent from the mobile terminal 10 to both SGSNs 32 and 40, these will in turn both forward 110 and 112 the traffic to the GGSN 56.

In a similar manner GGSN 56 routes any downlink traffic towards SGSN1 32 before the new PDP context was activated, and routes any downlink traffic 114 towards the SGSN2 after the new PDP context has been activated. Here it may at the same time route traffic 116 also to SGSN1 uring handover. It may thus route downlink traffic simultaneously to SGSN1 32 and SGSN2. Both SGSN1 and SGSN2 then forward data 118 and 120 to the mobile terminal 10.

These two parallel streams from the two mobile communication systems are then received by the radio circuit 14 of the mobile terminal 10 via the two access networks. The two streams according to the two PDP contexts may furthermore be combined by the radio circuit 14. In this way it is possible to obtain more accurate data than when only one stream is received.

SGSN2 then notifies 122 HLR 50 that the new PDP context has been activated and been used for both downlink and uplink traffic.

The HLR 50 then knows that a functional network connection exists between the mobile terminal 10 and the second mobile communication system. Therefore it deactivates the old subscription 124. This means that the HLR 50 makes sure that the network connectivity of the mobile terminal 10 with the first mobile communication system is only ended after it has been informed that the PDP context has been set up in the second core network 38. It thus triggers the tearing down of the network connectivity in the first mobile communication system after the network connectivity has been set up in the second mobile communication system. The deactivation may involve barring the mobile terminal from using the bearer services, and disallowing the performing of signaling procedures except for retrying to attach.

In order to do this, the HLR 50 thereafter initiates a "Cancel Location" 126 and 128 with cancellation type as "subscription withdrawn" towards SGSN1 32 and MSC1/VLR1 34/36. This is done in order for SGSN1 and MSC1 SGSN1 to remove data associated with the mobile terminal 10 and IMSI1. After having received the cancel location message, SGSN1 deactivates and deletes the old PDP context 130 to the GGSN 56 and receives a PDP deleted response 132 from the GGSN 56 when GGSN 56 is finished. SGSN1 32 then send a request 134 to the mobile terminal 10 to detach from the first mobile communication system, i.e. to stop being connected using the subscriber identity IMSI1 , on which the mobile terminal responds with an acknowledgment or accepting of the detachment 136 and thereby the mobile station 10 is detached from SGSN1 32 and MSC1/VLR1 42/44. After the mobile terminal 10 has been detached, SGSN1 then acknowledges the cancelled location 138 to the HLR 50.

HLR 50 now knows that the network connectivity of the mobile terminal with the first mobile communication system has ceased and thereafter notifies 144 the BSS 54 about this in a message "change subscription response" 142.

The smart card may then disable the old subscription, i.e. the subscription associated with IMSI1, which may be done through setting a disabled flag associated with the IMSI. At the same time it may enable the new subscription through setting an enable flag associated with IMSI2. In this way it is ensured that only the enabled IMSI is used for future reattachment. As an alternative it is possible that the smart card deletes IMSI1 and only retains IMSI2, It can in this way be seen that the mobile terminal 10 changes from the first subscription to the second subscription via the two core networks and especially under control of common entities of the two core networks. This provides a significant improvement in the time it takes to change between the two mobile communication systems. Furthermore, as the two PDP contest are allowed to be in force simultaneously, there is a soft handover between the two mobile communication systems. The mobile terminal will thereby not lose any data. The mobile terminal is thus able to change to the new subscription and new operator network in real time without device reset or detach/reattach, so that real time traffic will not be interrupted during subscription change. This may be important in some applications such as when providing hazard warnings in automobiles.

Some examples of triggers to change an operator on a smart card could be (but not restricted to) the following:
Location change
Roaming
Time (e.g. contract period)
Customer (enterprise) request It can also be seen that in the second embodiment it is possible to obtain a change without having to involve the smart card or the SM.

It is possible to vary the second embodiment. It is for instance possible that the subscription manager is used for triggering a change of subscription. In this case the BSS 54 could send a request the SM 48 to change the subscription. The Remote SM 48, would then trigger a subscription change on the smart card 12. The SM may find out from a database where the destination address of the smart card is (SMS, or HTTP, etc.) for IMSI2, and then it will send to the smart card through sending a request to the mobile terminal 10, for instance via SMS or using an HTTP connection, to enable the new subscription in the second mobile communication system. This request would be a special request designed for the smart card, and would comprise IMSI2 that is to be enabled. The request would then be received by the radio circuit 14 and forwarded to the smart card 12, which then would respond with an enablement of the new subscription of IMSI2 to the subscription manager, which in turn would notify the BSS 54. The smart card 12 would then order the radio communication circuit 14 to obtain connectivity with the second mobile communication system.

It is also possible that there are two GGSNs and two HLRs, one in each core network. In this case the BSS may act as attachment control module and the HLR of the first core network or the SM acting as a informing module, with the BSS acting as attachment control module. An SGSN will then communicate with the HLR and GGSN of the own core network. BSS 54 will in this case instruct the HLR of the second core network 38 to activate the new subscription and possibly also instruct the HLR of the first core network 30 to make SGSN1 issue a page or directly instruct SGSN1 to issue the page. The HLR of the second core network 38 would then send a change subscription response after the new PDP context is activated. This would signal to BSS 54 that a functional connection exists in the second mobile communication system and BSS 54 would then request HLR of the first core network 30 to deactivate the old subscription.

Figure 8:
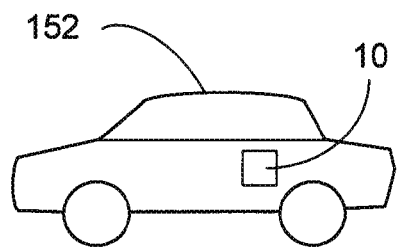
FIG. 8 shows one realization of the mobile terminal when being provided in a vehicle.

The terminal may as an example also be provided in a vehicle, such as a car 152 or a truck. One such realization is shown in FIG. 8.

The notifying module may be considered as being implemented as means for initiating the sending of an instruction to a mobile terminal, via a first mobile communication system to which the mobile terminal is attached, to change subscriber identity from a first subscriber identity used in the first mobile communication system to a second subscriber identity for use in a second mobile communication system.

The means for initiating the sending of an instruction may be considered to comprise means for initiating the sending of a dedicated enabling signal for changing to the second subscriber identity or as means for initiating the sending of a paging signal for the mobile terminal comprising instructions to attach to the second mobile communication system.

The attachment control module may be considered as being implemented as means for initiating, after obtaining knowledge of the mobile terminal having attached to the second mobile communication system based on the second subscriber identity, a detachment procedure in the first mobile communication system in relation to the first subscriber identity.

In a similar manner the smart card or the radio circuit may be considered to comprise mean for receiving via a first mobile communication system to which the mobile terminal is attached, an instruction from a subscriber identity changing arrangement to change subscriber identity from a first subscriber identity used in the first mobile communication system to a second subscriber identity for use in a second mobile communication system, When implemented in the smart card, the means for receiving an instruction may also be considered to comprise means for receiving an enabling signal from a subscription manager and means for controlling the radio circuit to attach to the second mobile communication system based on the content of the enabling signal.

The radio circuit may also be considered to comprise means for attaching to the second mobile communication system based on the second subscriber identity and means for detaching from the first mobile communication system after having attached to the second mobile communication system.

The mobile communication systems are with advantage Wideband Code Division Multiple Access Systems (WCDMA). However, they may as an example also be GPRS systems or Long Term Evolution (LTE) systems.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A subscriber identity changing (SIC) apparatus for at least one mobile communication system, said SIC apparatus comprising a processor and memory, said memory containing computer instructions executable by said processor wherein said SIC apparatus is operative to:
   initiate sending of an instruction to a mobile terminal, via a first mobile communication system to which the mobile terminal is attached, to change a subscriber identity from a first subscriber identity used in the first mobile communication system to a second subscriber identity for use in a second mobile communication system, wherein the mobile terminal is separate and distinct from said SIC apparatus and the mobile terminal is located remotely from said SIC apparatus,
   obtain information indicating that a functional network connection exists between the mobile terminal and a serving node of the second mobile communication system, and
   initiate a detachment procedure in the first mobile communication system in relation to the first subscriber identity after obtaining the information indicating that the functional network connection exists between the mobile terminal and a serving node of the second mobile communication system, wherein
   said information indicating that a functional network connection exists between the mobile terminal and said serving node of the second mobile communication system comprises information indicating that a packet data protocol (PDP) context for the mobile terminal has been activated in the second mobile communication system.

2. The subscriber identity changing apparatus according to claim 1, wherein if data is transmitted to or from the mobile terminal before the detachment, then this data is sent in both the first and the second mobile communication system.

3. The subscriber identity changing apparatus according to claim 1, wherein the subscriber identity changing apparatus when initiating the sending is operative to initiate the sending of a dedicated enabling signal for changing to the second subscriber identity.

4. The subscriber identity changing apparatus according to claim 3, wherein the dedicated enabling signal is a paging signal for the mobile terminal comprising instructions to attach to the second mobile communication system.

5. The subscriber identity changing apparatus according to claim 3, wherein the dedicated enabling signal is an enabling signal of a subscription manager intended for a smart card in the mobile terminal and the initiating comprises instructing the subscription manager to send the enabling signal.

6. The subscriber identity changing apparatus according to claim 1, further comprising a home location register that is common to the two mobile communication systems, said common register comprising the computer instructions initiating the sending of an instruction to the mobile terminal through instructing a communication handling unit to send the instructions and also comprising the computer instructions initiating the detachment procedure.

7. The subscriber identify changing apparatus according to claim 1, wherein each mobile communication system comprises a separate home location register and further comprising a business support centre comprising instructions instructing the home location register of the second mobile communication system to activate a subscription associated with the second subscriber identity and instructing the home location register of the first mobile communication system to deactivate a subscription associated with the first subscriber identity after receiving notice from the home location register of the second mobile communication system that the second subscription has been activated.

8. A method for changing mobile communication system a mobile terminal is to communicate with, the method being performed in a subscriber identity changing (SIC) apparatus and comprising:
 initiating sending of an instruction to the mobile terminal, via a first mobile communication system to which the mobile terminal is attached, to change subscriber identity from a first subscriber identity used in the first mobile communication system to a second subscriber identity for use in a second mobile communication system,
 obtaining information indicating that a functional network connection exists between the mobile terminal and a serving node of the second mobile communication system, and
 initiating a detachment procedure in the first mobile communication system in relation to the first subscriber identity after obtaining the information indicating that the functional network connection exists between the mobile terminal and a serving node of the second mobile communication system, wherein
 the initiating of the detachment procedure is based on a packet data protocol context being activated in the second mobile communication system, and
 the mobile terminal is separate and distinct from said SIC apparatus and the mobile terminal is located remotely from said SIC apparatus.

9. The method according to claim 8, wherein if data is transmitted to or from the mobile terminal before the detachment, then this data is sent in both the first and the second mobile communication system.

10. The method according to claim 8, wherein the instruction is concerns a dedicated enabling signal for changing to the second subscriber identity.

11. The method according to claim 10, wherein the dedicated enabling signal is a paging signal for the mobile terminal comprising instructions to attach to the second mobile communication system.

12. The method according to claim 10, wherein the dedicated enabling signal is an enabling signal of a subscription manager intended for a smart card in the mobile terminal and the initiating comprises instructing the subscription manager to send the enabling signal.

13. The method according to claim 8, wherein there is a home location register that is common to the two mobile communication systems, said initiating the sending of an instruction to the mobile terminal comprising the common home location register instructing a communication handling unit to send the instructions and initiating the detachment procedure.

14. The method according to claim 8, wherein each mobile communication system comprises a separate home location register and further comprising instructing the home location register of the second mobile communication system to activate a subscription associated with the second subscriber identity and instructing the home location register of the first mobile communication system to deactivate a subscription associated with the first subscriber identify after receiving notice from the home location register of the second mobile communication system that the second subscription has been activated.

15. A mobile terminal for communication with at least one mobile communication system, said mobile terminal comprising a radio circuit for communicating with a first and a second mobile communication system and being configured to:
 receive, via a first mobile communication system to which the mobile terminal is attached, an instruction from a subscriber identity changing (SIC) apparatus to change subscriber identity from a first subscriber identity used in the first mobile communication system to a second subscriber identity for use in the second mobile communication system, wherein the SIC apparatus is separate and distinct from the mobile terminal,
 initiate activation of a packet data protocol (PDP) context in the second mobile communication system after receiving from the SIC apparatus the instruction to change subscriber identity, wherein the mobile terminal initiates the activation of the PDP context by transmitting an attach request to a serving node in the second mobile communication system, and
 receive from a serving node in the first mobile communication system a request to detach from the first mobile communication system, wherein
 the detaching is made after the packet data protocol context has been activated in the second mobile communication system.

16. The mobile terminal according to claim 15, wherein if data is transmitted to or from the mobile terminal before the detachment, then this data is sent in both the first and the second mobile communication system.

17. The mobile terminal according to claim 16, wherein the radio circuit is configured to receive data in two separate data streams from the two mobile communication systems and combine said two data streams into a single data stream.

18. The mobile terminal according to claim 15, wherein the instruction to change is received in a dedicated enabling signal.

19. The mobile terminal according to claim 18, wherein the dedicated enabling signal is a paging signal comprising instructions to attach to the second mobile communication system.

20. The mobile terminal according to claim 18, wherein the enabling signal is an enabling signal from a subscription manager and further comprising a processor and memory, said memory containing instructions executable by said processor for receiving the enabling signal and control the radio circuit to attach to the second mobile communication system based on the content of the enabling signal.

21. The mobile terminal according to claim 15, wherein it is provided in a vehicle.

22. A method of changing communication from a first mobile communication system to a second mobile communication system, the method being performed in a mobile terminal and comprising:
 receiving, via the first mobile communication system to which the mobile terminal is attached, an instruction from a subscriber identity changing (SIC) apparatus to change subscriber identity from a first subscriber identity used in the first mobile communication system to a second subscriber identity for use in a second mobile communication system, wherein the SIC apparatus is separate and distinct from the mobile terminal, initiating activation of a packet data protocol (PDP) context in the second mobile communication system after receiving from the SIC apparatus the instruction to change subscriber identity, wherein initiating the activation of the PDP context comprises the mobile terminal transmitting an attach request to a serving node in the second mobile communication system, and receiving from a serving node in the first mobile communication system a request to detach from the first mobile communication system, wherein the detaching is made after the packet data protocol context has been activated in the second mobile communication system.

23. The method according to claim 22, wherein if data is transmitted to or from the mobile terminal before the detachment, then this data is sent in both the first and the second mobile communication system.

24. The method according to claim 23, further comprising receiving data in two separate data streams from the two mobile communication systems and combining said two data streams into a single data stream.

25. The method according to claim 22, wherein the instruction to change is received in a dedicated enabling signal.

26. The method according to claim 22, wherein receiving the instruction comprises receiving a paging message addressed to the mobile terminal, wherein the paging message comprises the instruction.

27. The method according to claim 25, wherein the dedicated enabling signal is an enabling signal of a subscription manager and further receiving the enabling signal in a smart card of the mobile terminal and controlling by the smart card a radio circuit to attach to the second mobile communication system based on the content of the enabling signal.

* * * * *